Patented Nov. 22, 1949

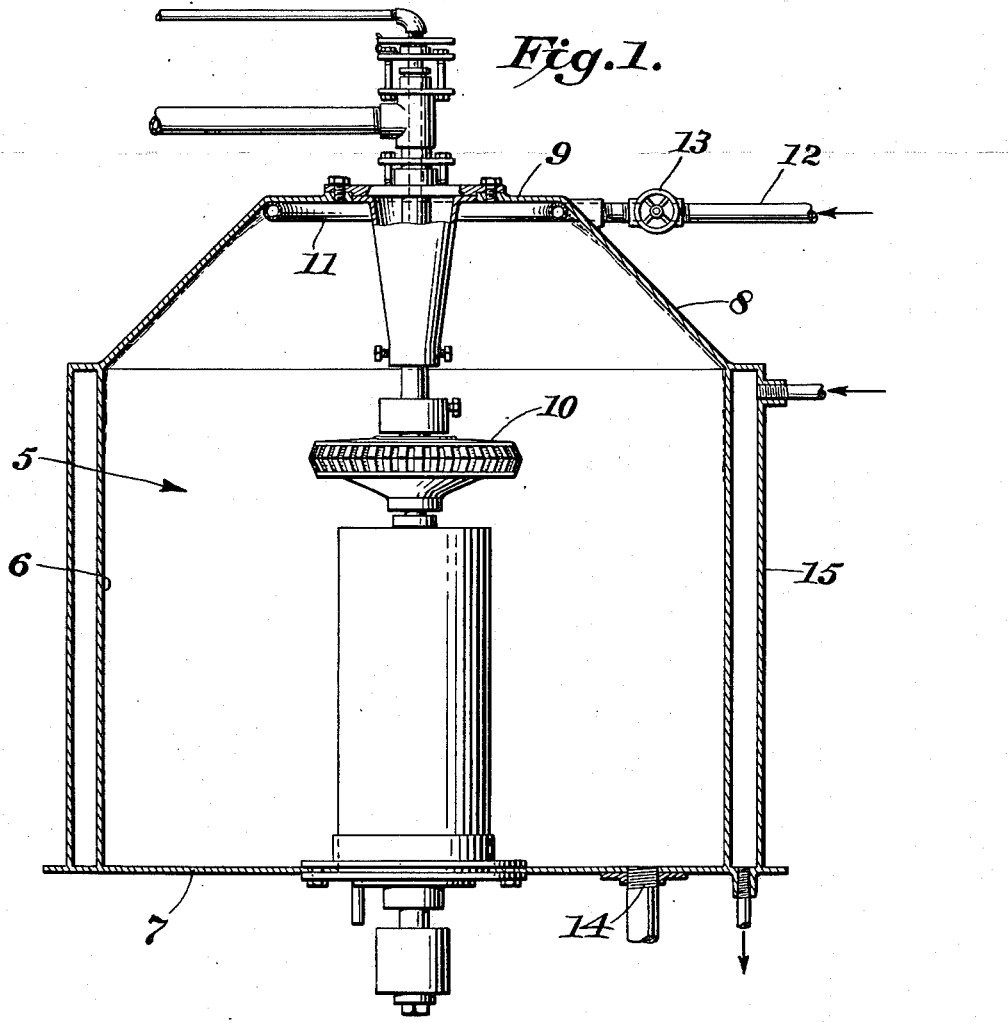
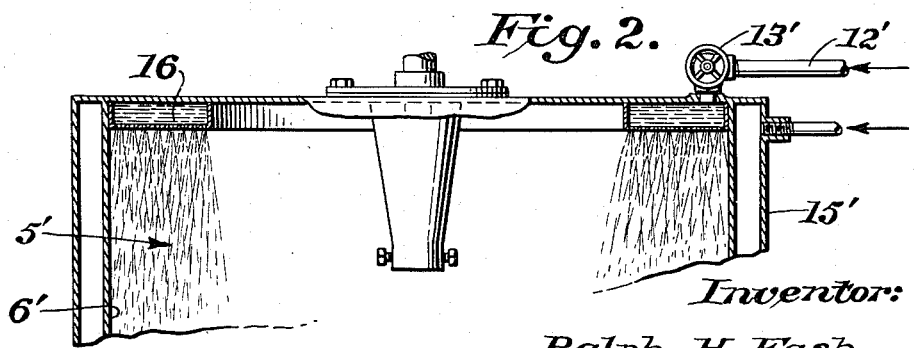

2,489,176

UNITED STATES PATENT OFFICE 2,489,176

METHOD OF MIST MIXING

Ralph Henry Fash, Fort Worth, Tex., assignor to Anderson, Clayton & Co., Houston, Tex., a corporation of Delaware Application October 3, 1945, Serial No. 620,099

8 Claims. (Cl. 260—417)

Major problems in some industries which produce compounds by the interaction of chemicals are the reduction of occlusion of unreacted chemicals and by-products in the desired compound and the subsequent removal of these materials and unoccluded by-products from the desired compound. To reduce these occlusions to a minimum, the reactants are mixed slowly in dilute solutions, usually in batches. The desired compound obtained is subsequently washed to remove the undesired materials. Where the desired compound is soft and insoluble in water, such as, for example, the jelly formed in the manufacture of silica gel or a catalyst such as alumina-silica gel, the jelly must be disintegrated, mixed with water and separated from the wash water. This washing procedure is carried out until the product is sufficiently free from undesired materials. Where the desired compound is soluble in water, such as in the case of soap, the wash water is added to the soap and the soap caused to form a curd by the addition of salt, the curd soap floating on the top of the salt solution, which latter contains the glycerine and any excess caustic. In the coagulation of synthetic latex of the butadiene-styrene type by means of acid, the addition of acid to a tank of latex would result in converting the latex into a large lump of coagulated rubber containing uncoagulated latex, acid and the serum. To prevent this result, the present day practice is to give the latex a preliminary wash with salt water prior to coagulating by the addition of acid. Latex thus treated with salt water will, when acid is added to it, coagulate in small sized crumbs which can be washed to free the crumbs of the surface, water-soluble materials. However, since these crumbs of coagulated latex are appreciable in size, there remains in the interior of these crumbs occluded uncoagulated latex, serum and acid that are present in the final product.

I have found that using my mist-mixing procedure, disclosed in U. S. Patent No. 2,341,536, the practical elimination of occluded undesired products of reaction is obtained and that by collecting the mist mixture in a liquid screen, the removal of the products of reaction is facilitated. The liquid added to the reaction chamber to act as a vehicle for the removal of the products of reaction from the chamber may also serve as at least the first washing liquid to remove the undesired products of reaction from the desired compound. In undesired products of reaction I include any excess chemical as well as the by-products. In the mist-mixing process, the use of one of the reagents in excess to insure complete consumption of the other or others is desirable. Using present day methods of mixing, if concentrated solutions of the reactants were used the product obtained would contain occluded in different parts portions of all the reactants used. In the case of the product obtained by means of using mist-mixing, the product would have occluded only the reactant used in excess.

One object of my invention is to facilitate the removal of mist-form reaction products from a reaction chamber by collecting the products in a liquid screen.

Another object is to effect a washing of the reaction products by collecting them in a liquid screen which serves not only as a vehicle but also as a washing medium.

Another object is to increase the efficiency of the washing of the desired product by washing it while in mist form.

Another object is to produce superior reaction products with simplified procedure.

EXAMPLE #1

*Soap*

In the manufacture of soap by the saponification of oils and fats in kettles, dilute solutions of caustic soda are used because concentrated solutions would result in the "graining" of the soap with the resultant stoppage of saponification. While a concentrated caustic soda solution may be added slowly to the fats being saponified, the concentration of the caustic in the kettle must be kept below that which would grain the soap. This concentration is very low.

In the manufacture of soap using the mist-mixing procedure of my said patent for mixing the oil or fat and the caustic soda solution, the fatty material and the caustic solution are mixed at a temperature of about 100° C. to 150° C. The caustic solution has a concentration of about 40% to 70%. A slight excess of caustic is preferably used to insure complete saponification. Because of the concentration of the caustic soda solution, the resultant soap would ordinarily collect as a solid mass on the sides of the reaction chamber, along with the glycerine, excess caustic solution, and water. One phase of my invention resides in the use of the concentrated caustic solution and heat in the ranges above mentioned whereby a relatively dry soap is produced. In accordance with preferred practice under the invention the reaction products in mist form are impinged upon a screen of a liquid which will not dissolve the soap but will dissolve the glycerine, excess caustic solution, and water.

The washing liquid may be a salt solution, for example brine. The concentration of the salt solution will vary with the kind of soap. For example, a salt concentration of about 10° to 12° Bé. is sufficient for a tallow soap and a concentration of about 14° Bé. is usually necessary for a cocoanut oil soap. The salt solution is preferably presented as a thin sheet flowing on a surface in a discharge path of the mist formed reaction products. The fine mist particles of soap impinge on this sheet of water and are carried from the reaction chamber. Simultaneously, the glycerine and excess caustic solution present on the surfaces of the soap particles will dissolve in the salt solution. The soap can be separated from the salt solution by a rotary vacuum filter or other suitable means. The salt solution can be used over again thereby increasing its glycerine content and thus decreasing the cost of manufacturing glycerine from it.

EXAMPLE #2

*Inorganic jellies*

In the manufacture heretofore of inorganic jellies, such as silica jelly from which silica gel is manufactured and alumina-silica jelly from which a catalyst is produced, dilute solutions of the reactants from which the jellies are formed are mixed slowly with violent agitation. The mixture on standing for some time sets to a jelly. If concentrated solutions of the reactants were used, jellies would be immediately formed when the reactants were mixed and by reason of this immediate formation of the jelly, the reactants would be mixed non-uniformly resulting in the occlusion in the jelly of a large percentage of unconsumed reactants. This procedure would increase the cost of manufacture by reason of the incomplete utilization of the reactants and the necessity for their subsequent removal by repeated washing. Present day procedure is illustrated in U. S. Patents Nos. 1,297,724 and 1,577,186.

In the application of the mist-mixing process, as disclosed in U. S. Patent No. 2,341,536, to the manufacture of inorganic jellies, it is possible to use concentrated solutions of the reactants with the immediate formation of the jelly and without the detrimental occlusion in the jelly of unconsumed reactants. The jelly is formed during the approximately 0.01 second required for the reactants to pass through the centrifugal atomizer-mixer head. As a result, the jelly mist will impinge on the walls of the reaction chamber, in the absence of the liquid screen, where it will collect. As an example of this procedure, I have mixed a sodium silicate solution having a specific gravity of 1.231 @ 20° C. with a solution of aluminum sulphate having a specific gravity of 1.217 @ 20° C. obtaining on the side of the reaction chamber an alumina-silica jelly containing approximately 75% water where a similar jelly produced in accordance with present day practices contains about 90% water.

In the use of the mist-mixing process, as disclosed in U. S. Patent No. 2,341,536, in the manufacture of silica jelly, it is possible to use the commercial concentrations of sodium silicate on the market, but I prefer to add a small amount of water to take advantage of the fact that the addition of a small amount of water to commercial sodium silicate solutions greatly reduces its viscosity. The resultant slightly diluted sodium silicate solution is much more concentrated than that now being used in present day practice, the comparison being, for example, in the case of U. S. Patent 1,297,724 a specific gravity of about 1.185 compared with a specific gravity of 1.275 using the mist-mixing process.

The acid used to form silica jelly by means of the mist-mixing process can be concentrated acid. I have successfully used concentrated sulphuric acid containing 98% acid compared with a 10% concentration of acid disclosed in U. S. Patent No. 1,297,724.

It is a feature of the present invention that by using the high concentrations of the reactants in the mist-mixing procedure, I am enabled to provide a superior jelly having a water content much lower than heretofore possible.

The products of reaction in the formation of silica jelly, using sulphuric acid and sodium silicate, are silica and sodium sulphate, and in the case of the formation of the alumina-silica jelly, using aluminum sulphate and sodium silicate, they are alumina, silica and sodium sulphate. In the preferred practice of my invention, the mist-formed reaction products, just as in Example 1, are impinged on a screen of a liquid which will not dissolve the jelly but will dissolve the sodium salts, for example water. The fine mist particles of the jelly will impinge on the screen and be carried from the reaction chamber. Simultaneously, the sodium sulphate and any excess reactant will dissolve in the water. The jelly can be separated from the water by a rotary vacuum filter or other suitable means.

EXAMPLE #3

*Synthetic rubber*

In the coagulation of synthetic latex, such as the butadiene-styrene type which requires a preliminary salt water treatment to prevent the formation of large lumps of coagulated rubber, with acid using the mist-mixing procedure of my said patent, the latex, without the usual preliminary treatment with a salt solution, is mixed with the acid. The products of this mixing are coagulated rubber and acid solution mixed with the latex serum. In the absence of the collecting screen of liquid, the rubber will emerge from the reaction chamber in the form of crumbs suitable for subsequent treatment. However, some of the product will adhere to and build up on the walls of the reaction chamber. Accordingly, in the preferred practice of the invention, the liquid screen is used, serving to shield the chamber walls from the reaction product and also to dissolve the serum-acid mixture but not the rubber. Water is a suitable liquid and the liquid screen may be formed in the manner mentioned in connection with the previous examples. In the use of the liquid screen, the coagulated rubber is in the form of minute particles. It can be separated from the serum-acid solution by means of a rotary vacuum filter or other suitable means.

Preferred apparatus for the practice of the invention is shown in the accompanying drawing, in which Figure 1 is a vertical axial section of a reaction chamber equipped with mist-mixing means and with means for producing a liquid screen and Figure 2 is a partial section like that of Figure 1 showing a modification.

Referring to Figure 1, the reaction chamber 5 is defined by a cylindrical wall 6, a bottom wall 7, an upward extension 8 in the form of a truncated cone, and a top wall 9. Reference numeral 10 designates a centrifugal atomizing and mixing head of the type shown in my aforementioned patent and supplied in the same manner with the reactants. Disposed in the angle between walls 8 and 9 is a spray ring 11 having a multiplicity of lower openings directed against the wall 8 so that when the ring is supplied with liquid through a pipe 12 and valve 13, a continuous, enveloping sheet of the liquid will form on the wall 8 and will flow down the wall 6 still as a continuous sheet. Ordinarily it is sufficient to supply only enough liquid as will insure the complete covering of the inner wall since the mist particles circumferentially expelled from the head 10 have substantially no mass and will be intercepted by a liquid sheet of extreme thinness. The extension 8 is provided for the purpose of positioning the top wall 9 high enough so that the projected mist mixture will not substantially collect thereon. Also, the horizontal area of the top wall is reduced. The mixture flows from the chamber 5 through an outlet 14 for treatment as required. The liquid sheet can be conditioned as to temperature by supplying the desired conditioning medium to a jacket 15 which surrounds the wall 6. In the examples hereinbefore given, the liquid can be at room temperature.

In Figure 2 the reaction chamber and appurtenances are the same as in my said patent except for the addition of a spray ring 16 positioned beneath the top wall of the chamber and adapted to deliver downwardly an enveloping liquid screen whose streams are sufficient to insure the complete interception of the projected mist mixture.

The particles of the desired mist-mixed produced material collected on the liquid screen are extremely small in size and hence the surface of these particles in contact with the liquid of the screen is enormous. As a result of this contact, the efficiency of washing is greatly enhanced. This fineness of particle size of the desired product also results in the rapid movement of the liquid-soluble material contained in the interior of these particles to the surface of the particles by reason of the reduction of the concentration of the liquid-soluble material at the surface of the particles by the washing action of the liquid. Thus the method of collecting and washing the desired mist-mixed produced material by means of a liquid screen not only removes the normally occurring liquid-soluble substances on the surface of the particles but also removes such of the occluded materials as reach the surfaces of the particles due to the rapid diffusion which can occur because of the extremely small particle size. Due to this action the single washing will often suffice, as against the repeated washings frequently required heretofore. However, should further washing be required, the products are in ideal condition for the operation since they are in the form of extremely minute discrete particles and, hence, any occluded material is capable of rapid diffusion to the surface.

The considerations involved in the formation of mist mixtures and explained in my said patent, also in my Patent No. 2,342,042, of course apply in the practice of the present invention. As in those patents, a "mist" herein is an "aerosol."

It will be understood that the disclosure herein is intended to be illustrative and not restrictive and that the invention extends to variations in procedure and apparatus coming within the terms of the following claims.

I claim:

1. The method which comprises mist-mixing a plurality of reactants to produce mist-form reaction products, said products including an undesired product, and impinging said reaction products while in mist form upon a continuously moving independent collecting liquid screen in which the undesired product is soluble and the main product is relatively insoluble and in which both products are collected for subsequent separation.

2. The method which comprises mist-mixing a plurality of reactants to produce mist-form reaction products, said products including an undesired product, expelling said products in mist form circumferentially of a vertical axis toward a surface which surrounds said axis, and collecting the mixture in a sheet of an independent liquid flowing on said surface for subsequent separation, the undesired product being soluble in said liquid and the main product being relatively insoluble therein.

3. The method which comprises mist mixing a plurality of substances which will chemically react with each other and producing mist-form reaction products, said products including an undesired product, and impinging said reaction products while in mist form upon a vertical constantly moving independent collecting liquid curtain in which the undesired product is soluble and the main product is relatively insoluble and in which both products are collected for subsequent separation.

4. The method which comprises mist mixing a plurality of substances which will chemically react with each other and producing mist-form reaction products, expelling said products in mist form circumferentially of a vertical axis and collecting said reaction products for subsequent separation in an enveloping downwardly flowing curtain of an independent liquid in which the undesired product is soluble and the main product is relative insoluble.

5. In the manufacture of an inorganic jelly, the method according to claim 3 wherein a soluble silicate at high concentration is mist mixed with an acid at high concentration.

6. In the manufacture of soap, the method according to claim 3 wherein a fatty substance is mist mixed with a caustic alkali solution having a concentration of from about 40 to 70% at a temperature from about 100° C. to 150° C.

7. In the manufacture of synthetic rubber using a latex ordinarily requiring a preliminary salt water wash, the method according to claim 3 wherein the latex is mist mixed with an acid without the preliminary wash whereby to produce coagulated rubber in particle form.

8. In the manufacture of soap, the method according to claim 3 wherein heated fatty material is mist mixed with a concentrated caustic alkali solution and the mist-form reaction products are collected as a soap.

RALPH HENRY FASH.

REFERENCES CITED

The following references are of record in the file of this patent:

UNITED STATES PATENTS

| Number | Name | Date |
|---|---|---|
| 2,059,116 | Kiesskalt et al. | Oct. 27, 1936 |
| 2,086,514 | Saunders et al. | July 6, 1937 |
| 2,096,188 | Lorenz et al. | Oct. 19, 1937 |
| 2,136,283 | Dickinson et al. | Nov. 8, 1938 |
| 2,232,727 | Peterkin et al. | Feb. 25, 1941 |
| 2,267,426 | Saunders et al. | Dec. 23, 1941 |
| 2,341,536 | Fash | Feb. 15, 1944 |
| 2,342,042 | Fash | Feb. 15, 1944 |

FOREIGN PATENTS

| Number | Country | Date |
|---|---|---|
| 504,118 | Great Britain | Apr. 17, 1939 |